I. W. NONNEMAN.
DIE STOCK.
APPLICATION FILED JAN. 24, 1918.
1,306,021.
Patented June 10, 1919.
2 SHEETS—SHEET 1.
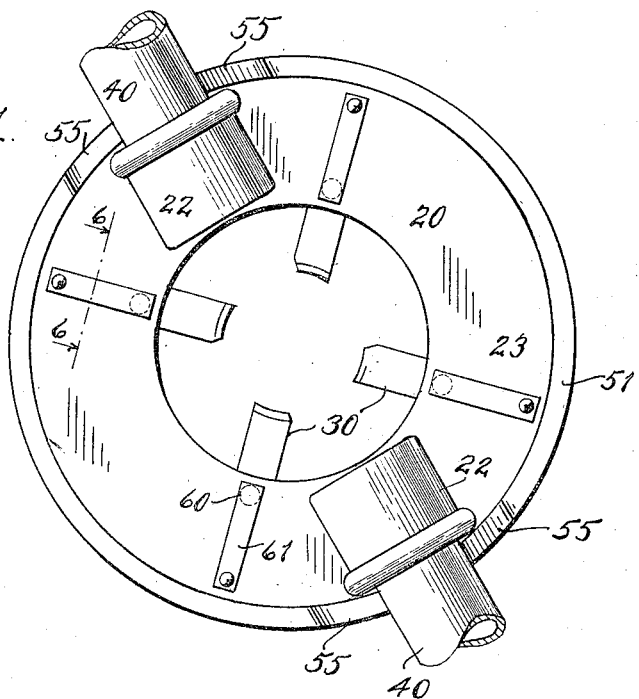
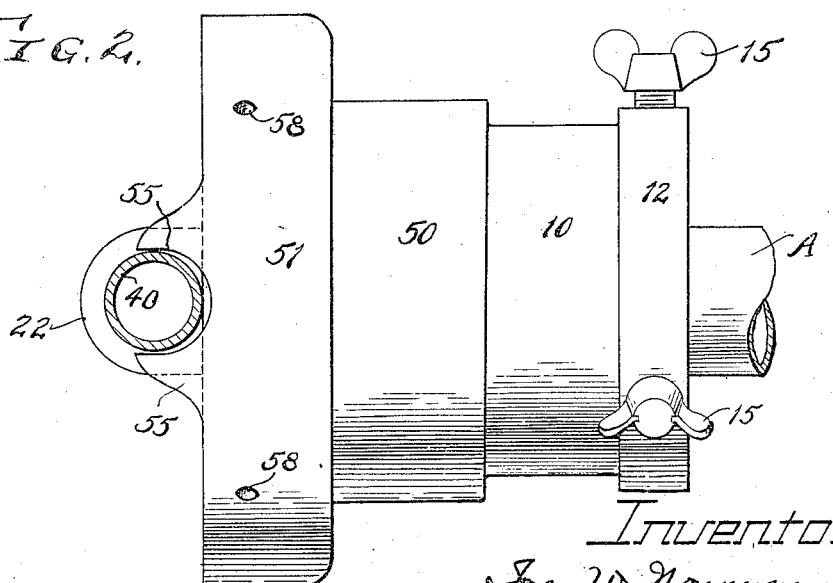
Inventor
Ira W. Nonneman,
By Baker & Macklin, Attys.

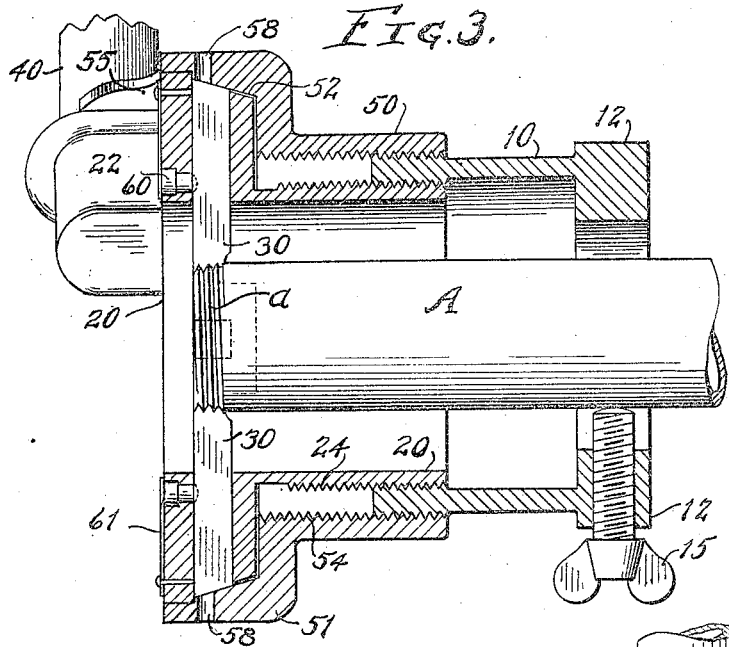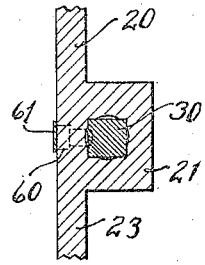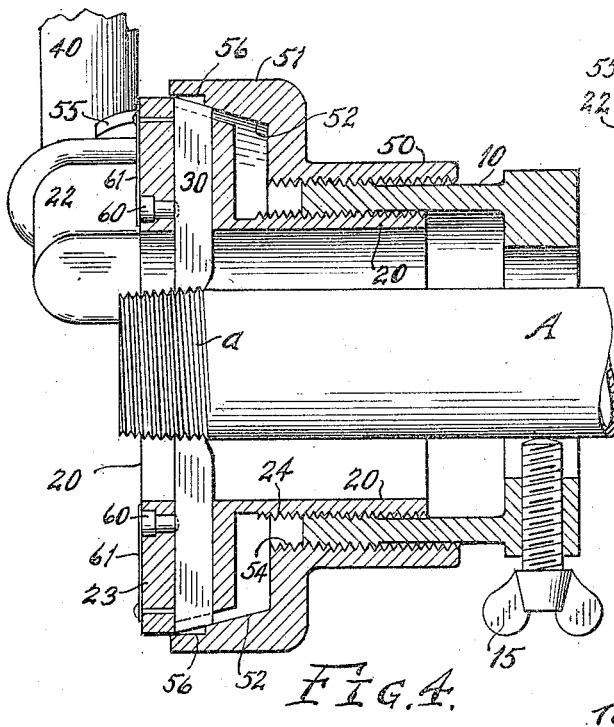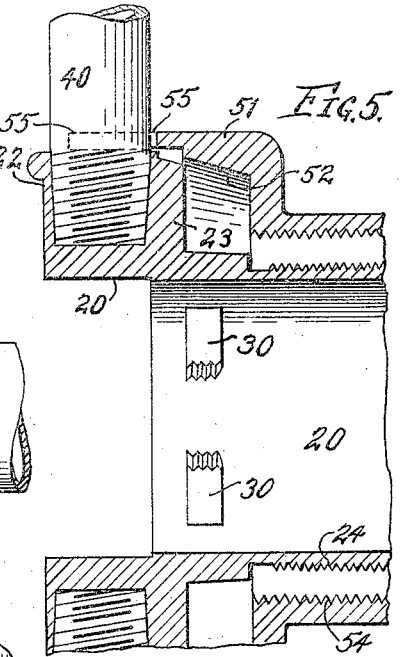

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

DIE-STOCK.

1,306,021. Specification of Letters Patent. Patented June 10, 1919.

Application filed January 24, 1918. Serial No. 213,451.

*To all whom it may concern:*

Be it known that I, IRA W. NONNEMAN, a citizen of the United States, residing at Warren, in the county of Trumbull and State of Ohio, have invented a certain new and useful Improvement in Die-Stocks, of which the following is a full, clear, and exact description, reference being had to the accompanying drawings.

This invention relates to a die stock of the type wherein the chasers recede to enable efficient cutting of a tapered thread on a pipe or other article. The main object of the invention is to render the construction extremely compact and simple, requiring very few parts and these of such a character that they may be cheaply made, while affording great accuracy in the continuous presentation of all of the chasers to the work. The die stock is illustrated in the drawings hereof and is hereinafter more fully explained and its essential novel characteristics are summarized in the claims.

In the drawings, Figure 1 is a front elevation of the die stock (the handles being broken away); Fig. 2 is a side elevation sectioned through one of the handles and looking along the axis of such handle; Fig. 3 is a longitudinal axial section in a plane through two of the chaser housings, showing the parts in the position they occupy before the chasers have receded; Fig. 4 is a similar view showing the parts in a position where the chasers have receded; Fig. 5 is an axial section through the sockets for the driving handles; Fig. 6 is a detail in cross section through one of the chaser housings, as indicated by the line 6—6 on Fig. 1.

In the drawings, A indicates a pipe to be threaded, and *a* the thread formed or being formed thereon.

One member of the die stock comprises a sleeve 10 adapted to surround the pipe and be stationarily clamped to it by suitable means, as for instance the three thumb screws 15 mounted in a reinforced portion 12 of the sleeve. Another member of the die stock comprises a rotatable frame 20 provided with radial housings 21 for the chasers 30 and also having sockets 22 for the operating handles 40. The housings 21 for the chasers may conveniently be enlargements or hollow bosses formed in the rear face of a front ring-like flange 23 of the chaser frame 20. The sleeve 20, flange 23 and housings 21 are preferably all one integral casting. A third member of the die stock comprises a sleeve 50 which has a cup-like head 51, preferably integral therewith, internally conical or tapered at 52 and bearing against the ends of the chasers 30.

The chaser-carrying sleeve 20 is adapted to extend within the stationary sleeve 10 and is provided with external threads 24, meshing with internal threads on the stationary sleeve. The abutment sleeve 50 lies on the outer side of the sleeve 10 and is provided with internal threads 54, engaging external threads on the sleeve 10. The threads 24 are of a finer pitch than the threads 54, from which it results that if the sleeves 20 and 50 are rotated together, the sleeve 50 will travel longitudinally along the sleeve 10 faster than the sleeve 20, and will thus move away from the sleeve 20.

Any suitable means may be employed to compel unity in the rotation of the sleeves 20 and 50, but the most satisfactory method is to provide ears 55 on the head of the sleeve 50 which embrace the handles 40 on opposite sides.

It results from the construction described that if the die stock starts working with the parts substantially in the position shown in Fig. 3, the chasers 30 will be in their innermost positions, then, as the threading progresses, the sleeve 50 will gradually recede from the head of the sleeve 20, and this, by reason of the conical surface 52, will allow the chasers 30 to gradually move outwardly, whereby they come for instance into the position shown in Fig. 4. This enables the chasers to cut a tapered thread. The pitch of the thread cut is the same as that of the thread 24 on the chaser carrier.

While the threads 24 on the chaser sleeve must have the same pitch as the threads *a* to be cut on the pipe, the threads 54 on the abutment sleeve may have any suitable pitch greater than the pitch of the sleeve 24, by properly tapering the cone surface 52. The more nearly the two threads approach each other in pitch the less will be the relative recedence of the abutment sleeve and the greater must be the taper of the abutment sleeve to compensate therefor.

By way of illustration, if the threads on the abutment sleeve were at twice the pitch of those on the chaser sleeve it would follow that whenever the chaser sleeve had moved a definite distance the abutment sleeve would have moved twice that distance, or, in other words, would have separated from the chaser sleeve a distance equal to the amount the chaser sleeve had moved. In that case the relation of the abutment to the chaser would be just the same as that of the chaser to the pipe, so that the taper 52 would be equal to the taper of the thread $a$.

As another example, if the threads 24 were eight to the inch and the threads 54 six to the inch, then when the die stock had made six rotations the abutment sleeve would have traveled one inch, and the chaser sleeve three-fourths of an inch, so that the abutment sleeve would have separated one-fourth of an inch from the chaser sleeve, while the chaser sleeve was traveling three-fourths of an inch, and accordingly the taper of the chaser sleeve would have to be three times that of the taper to be cut on the pipe.

The ratios mentioned are simply by way of illustration and for convenience in round numbers. The standard thread for pipes from one to two inches being eleven and one-half threads to the inch, and we have found that by using this threading on the sleeve 20 and ten threads to the inch on the sleeve 50 that we accomplish very satisfactory results. In any case, however, the taper of the abutment bears the same relation to the taper of the thread as the number of threads per inch on the abutment sleeve bears to the difference between the number of threads on the two sleeves. This gives us a formula as follows:

Let
$t$=taper of thread to be cut.
$T$=taper on the abutment sleeve.
$n$=number of threads per inch on the chaser sleeve.
$N$=number of threads per inch on the abutment sleeves.
Then
$$t = N : n - N$$
Or,
$$T(n-N) = tN$$
Or,
$$T = t\frac{N}{n-N}$$

In order to prevent chips working into the annular conical space between the chaser housings and the sleeve 51, as the latter recedes, I form a cylindrical rabbet 56 in the edge of the sleeve which is constantly occupied by the flange 23 of the chaser frame, this flange having a cylindrical periphery fitting the rabbet with reasonable snugness.

The chasers are prevented from inadvertently dropping out of the die stock when it is not in use by detent plungers 60 mounted in the head of the chaser frame and pressed toward the chasers by leaf springs 61 secured to the head. Shoulders on the plungers limit their inward movement. To enable the chasers to be removed most readily whenever desired, I provide openings 58 through the head 51 of the sleeve 50 which may be brought into registration with the ends of the chasers. Then the insertion of a wire, nail or other push rod may push the chaser inwardly free from the spring, retaining the plunger.

My die stock is very readily assembled by screwing the abutment sleeve 50 onto the thread of the stationary sleeve 10 to about the position shown in Fig. 3 and then screwing the chaser sleeve into the sleeve 10 until it abuts the abutment sleeve. Then the chaser sleeve is screwed out something less than half a rotation to bring the handle sockets 22 into registration with the space between the ears 55, and then the handles 40 are screwed into these sockets between the ears.

When assembled, the die stock will not come apart without the removal of the operating handles 40, for the engagement of the chaser sleeve and the abutment sleeve forms a nut-lock limiting the rotation in the screwing off direction, while the screwing in the other direction causes the sleeve 50 to abut the head 12 of the stationary sleeve before the chasers are cleared by the conical head 51. Accordingly, while the relative movement of the parts is provided for, the die stock is necessarily maintained in its assembled form so long as the handles are in place.

Among the advantageous characteristics of my die stock may be mentioned the cheapness of construction and assemblage, the die stock being made primarily of three simple castings which are easily made and machined by ordinary tools. The use of chasers having their full cross section throughout their length is an advantageous feature, as it makes the chaser cheaper to construct than where it is notched for the reception of the controlling device. By having all the chasers engaged by the same conical surface instead of by individual tapered elements, a uniform recession is provided for, which is important in maintaining all of the cutters in action throughout the operation. Where individual tapered elements are employed, one for each chaser, it has been found very difficult to machine them and secure them in place accurately enough so that all of the chasers are constantly acting.

Having thus described my invention, what I claim is:

1. In a die stock, the combination of a chaser frame, chasers movably mounted therein, a cup shaped head on the advancing side of the chaser frame and over-hanging the periphery of such frame and in such overhanging region having a conical surface flaring toward the trailing side of the chaser frame, said conical surface engaging the ends of the chasers carried by the frame, and means for causing the head to gradually draw off the chasers in the direction of travel of the chaser frame.

2. In a die stock, the combination of a sleeve adapted to be clamped to the work, a chaser-carrying sleeve having a threaded engagement with the work sleeve, and an abutment for the chasers having a threaded engagement with the work sleeve, said latter thread being coarser than the former, said abutment having its chaser engaging portion flaring in a direction longitudinally away from the work sleeve.

3. In a die stock, the combination of a sleeve adapted to be secured to the work, a chaser-carrying sleeve having a threaded engagement with the work sleeve, the pitch of said thread corresponding to the pitch of the work to be cut, chasers carried by the chaser sleeve, and an abutment sleeve formed with an internally tapered portion flaring toward the free end of the sleeve and engaging said chasers and with another portion having a threaded engagement with the work sleeve, the latter being of coarser pitch than the threads first mentioned.

4. In a die stock, the combination of a work sleeve internally and externally threaded, a chaser sleeve externally threaded and engaging the internal threads on the work sleeve, an abutment sleeve internally threaded and engaging the external threads on the work sleeve, the threads of the abutment sleeve being of different pitch from those of the chaser sleeve, chasers carried by the chaser sleeve, and an enlarged head on the abutment sleeve which is internally conical and overhangs the ends of the chasers and engages them.

5. In a die stock, the combination of a sleeve adapted to be secured stationarily to the work, a chaser sleeve extending into the stationary sleeve and having a threaded engagement therewith, chasers carried by the chaser sleeve, an abutment sleeve having a threaded engagement with the exterior of the work sleeve by threads of different pitch from those on the chaser sleeve, a part of said abutment sleeve surrounding the chasers and having an internal surface which is a portion of a cone coaxial with the die stock, such conical surface engaging the ends of the chasers and the chasers having their ends correspondingly beveled.

6. In a die stock, the combination of a stationary work-engaging sleeve internally and externally threaded, a movable chaser-carrying sleeve externally threaded and engaging the internal threads on the work sleeve, a movable abutment sleeve internally threaded and engaging the external threads on the work sleeve, the threads on the chaser sleeve being of the same pitch as the thread to be cut and the threads on the abutment sleeve being of coarser pitch, chasers carried by the chaser sleeve and an internally conical head on the abutment sleeve extending across the ends of the chasers and engaging them, the taper of the abutment sleeve being outward toward the free end of the sleeve and the taper angle bearing the same relation to the taper angle of the thread to be cut as the number of threads per inch on the abutment sleeve bears to the difference between the number of threads per inch on the two movable sleeves.

7. In a die stock, the combination of a frame adapted to be clamped to the work, a chaser-carrying sleeve and an abutment sleeve both threaded to said frame by threads of relatively different pitch, chasers carried by the chaser frame, the abutment member being provided with an enlarged head having a conical inner face which overhangs and engages the ends of the chasers.

8. In a die stock, the combination of a frame adapted to be clamped to the work, a chaser-carrying sleeve and an abutment sleeve both threaded to said work frame by threads of relatively different pitch, handle sockets on the chaser frame, and chasers carried by the chaser frame, the abutment sleeve carrying an internally conical head overhanging the ends of the chasers and having means slidably engaging the handle.

9. In a die stock, the combination of a frame adapted to be clamped to the work, a chaser-carrying frame and an abutment sleeve both threaded to the work frame by threads of relatively different pitch, chasers movably carried by the chaser frame, handle sockets on the chaser frame, handles occupying said sockets and extending outwardly, the abutment sleeve being provided with a head which has an internal conical surface overhanging and engaging the ends of the chasers, and ears on said head engaging said handles adjacent to but outside of the sockets.

10. The combination of a sleeve threaded internally and externally, means for clamping the sleeve to an article to be threaded, a chaser-carrying frame having housings with beveled outer ends and having a sleeve portion extending into the stationary sleeve and provided with external threads engaging it, said external threads having the same pitch as the thread to be cut, chasers carried in the housings and extending therethrough, an abutment sleeve having an internal thread engaging the external thread on the stationary sleeve and having a head which is internally conical and which overhangs the housings and engages the outer ends of the chasers, and means for preventing access to the space between said conical surface and the housings as the abutment sleeve recedes.

11. In a die stock, the combination of a sleeve adapted to be secured to the work, a chaser-carrying sleeve having a threaded engagement with the work sleeve, the pitch of said thread corresponding to the pitch of the work to be cut, chasers carried by the chaser sleeve and having beveled outer ends and an abutment sleeve having a threaded engagement with the work sleeve by threads of coarser pitch than the threads first mentioned and having an internally conical head overhanging and engaging the beveled ends of the chasers, said abutment head being formed with a cylindrical rabbet occupied by a flange on the chaser frame having a cylindrical periphery.

12. The combination of a stationary sleeve threaded internally and externally, means for clamping the sleeve to an article to be threaded, a chaser-carrying frame having a plate-like head with radial housings on its inner face and having a sleeve portion extending into the stationary sleeve and provided with external threads engaging it, said external threads having the same pitch as the thread to be cut, chasers carried in the housings and extending therethrough, the outer ends of the housings and the outer ends of the chasers being tapered toward the stationary sleeve, and an abutment sleeve having an internal thread engaging the external thread on the stationary sleeve and having a cup-like head which is internally conical which overhangs and engages the outer ends of the chasers and may substantially embrace the periphery of the chaser housings, the plate-like head of the chaser frame having a cylindrical periphery which closely occupies a cylindrical rabbet formed in the abutment head at the outer edge of the conical surface.

13. In a die stock, the combination of a frame adapted to be clamped to the work and having a sleeve with internal and external threads of different pitch, a chaser-carrying frame consisting of a single integral casting having a sleeve with external threads engaging the internal threads of the work frame and having a flat annular flange at its opposite end and having radial housings formed on the inner face of the flange on the outer side of the sleeve, radial chasers in said housings adapted to project beyond their outer ends, and an abutment sleeve having an internal thread screwing onto the external thread of the work frame and having an enlarged cup-like head with a conical inner surface engaging the outer ends of the chasers.

14. In a die stock, the combination with a work sleeve adapted to be clamped to a pipe to be threaded, a chaser frame having a thread engagement with the work sleeve by a thread having the pitch of a thread to be cut, chasers carried by the chaser frame, a cup shaped head on the advancing side of the chaser frame and overhanging its periphery, such overhanging portion having a conical inner face flaring in a direction longitudinally away from the work sleeve, and means connecting the cup shaped head and the work sleeve for causing the head to gradually draw off of the chasers toward the work sleeve at the chaser travels in that direction.

15. In a die stock, the combination of a sleeve member adapted to be clamped to the work and provided with internal and external threads of different pitch, a chaser-carrying frame having a sleeve portion extending into the work sleeve and having external theads engaging said internal threads, chasers carried by the chaser sleeve, and an abutment sleeve having internal threads engaging the external threads of the work sleeve and having a head surrounding the chasers and engaging their ends, the ends of the chasers and the inner face of the head being correspondingly tapered.

In testimony whereof, I hereunto affix mv signature.

IRA W. NONNEMAN.

Copies of this patent may be obtained for five cents each, by addressing the "Commissioner of Patents, Washington, D. C."